Jan. 29, 1963 F. A. D. SADLER 3,075,502
BOOSTER ASSISTED ACTUATING SYSTEMS
Filed June 13, 1960 6 Sheets-Sheet 3

Francis Antony Dawson Sadler
Inv.
by: Scrivener and Parker
Attys.

Jan. 29, 1963  F. A. D. SADLER  3,075,502
BOOSTER ASSISTED ACTUATING SYSTEMS
Filed June 13, 1960  6 Sheets-Sheet 5

Francis Antony Dawson Sadler
Inv.
by Scrivener and Parker,
Attys.

Jan. 29, 1963   F. A. D. SADLER   3,075,502
BOOSTER ASSISTED ACTUATING SYSTEMS
Filed June 13, 1960   6 Sheets-Sheet 6
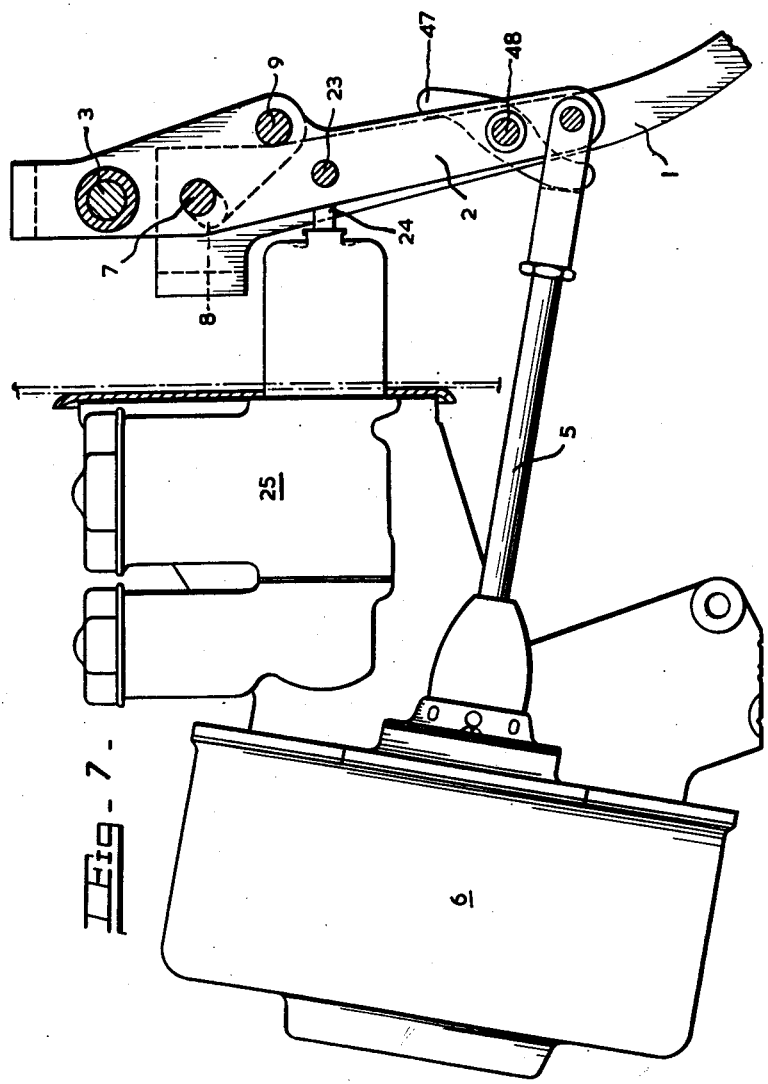

United States Patent Office 3,075,502
Patented Jan. 29, 1963

3,075,502
BOOSTER ASSISTED ACTUATING SYSTEMS
Francis Antony Dawson Sadler, Little Aston, near Sutton Coldfield, England, assignor to Girling Limited, Birmingham, England, a British company
Filed June 13, 1960, Ser. No. 35,822
Claims priority, application Great Britain June 13, 1959
8 Claims. (Cl. 121—41)

This invention relates to booster-assisted actuating systems of the kind in which a manually or other applied force acting on a member is augmented by a power-energised booster. It is common in such systems, especially for example in a system applied to the assistance of the braking effort in a vehicle, to arrange that the force can still be applied if the booster fails. It will, however, be clear that if the required force to be delivered to the actuated member is large enough to require booster assistance, then on failure of the booster the user may find he is incapable of producing the required force directly.

It is an aim of the present invention to arrange, in such a system, that the force required when the booster is inoperative is comparable with that required when the booster is in action. This must, of course, be paid for in increased travel of the force-applying member, but this is acceptable in an emergency.

According to the invention, therefore, in a booster-assisted actuating system in which a manually or other applied force acting on a member is augmented by a power-energised booster, the applied force is applied to a first lever, this lever co-operating with a second lever coupled to the booster in such a manner that when the booster is in action, the first and second levers pivot or rock together about a fixed fulcrum and when the booster is inoperative the first lever pivots or rocks about another fulcrum positioned so that in this latter condition a greater angular movement of the first lever is required to effect a given displacement of the member acted upon than when the two levers move together about the first-mentioned fulcrum.

In this way, the effective leverage changes, according to whether or not the booster is in action, and it will be understood that the position of the second fulcrum can be arranged so that the applied force required to produce a given displacement of the member acted upon or to produce a given force at that member is substantially the same, or at least of the same order when the booster is inoperative as when it is in action, the penalty being paid in the increased travel of the first lever.

The member acted upon is conveniently connected to the first lever. It may for example be the braking system of a motor vehicle, either part of a mechanical linkage or the piston rod of a brake master cylinder, and the first lever could be connected to the vehicle brake pedal lever or could itself be that brake pedal lever.

The invention will now be described by way of example with reference to the accompanying drawings, in which:

FIGURE 6 shows yet another form, specially suited to situations where it is inconvenient for the booster to be close to the pedal; and FIGURE 7 shows another form of vehicle braking booster.

Figure 1:
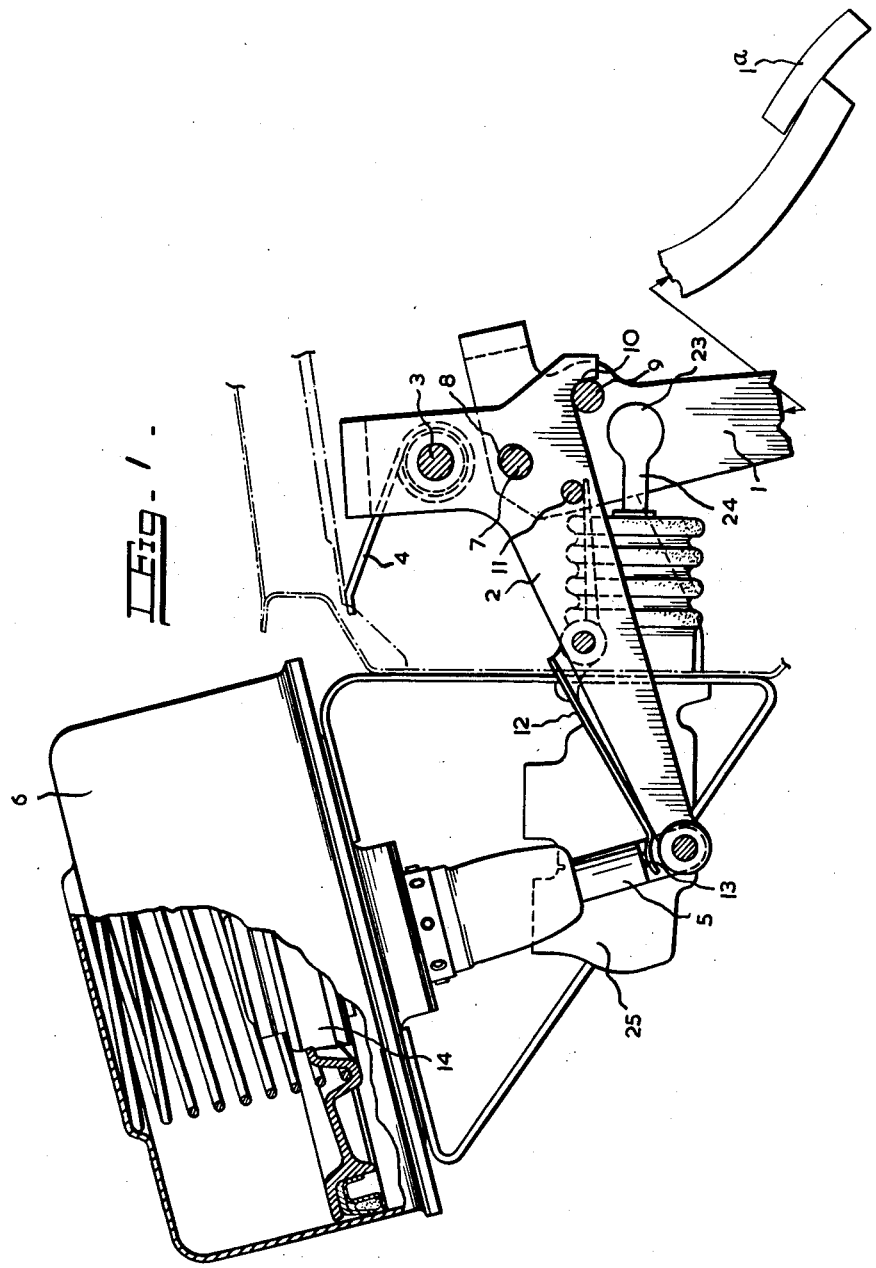
FIGURE 1 shows the invention applied to assistance of the braking effort of a hydraulic braking system of a vehicle.
Figure 2:
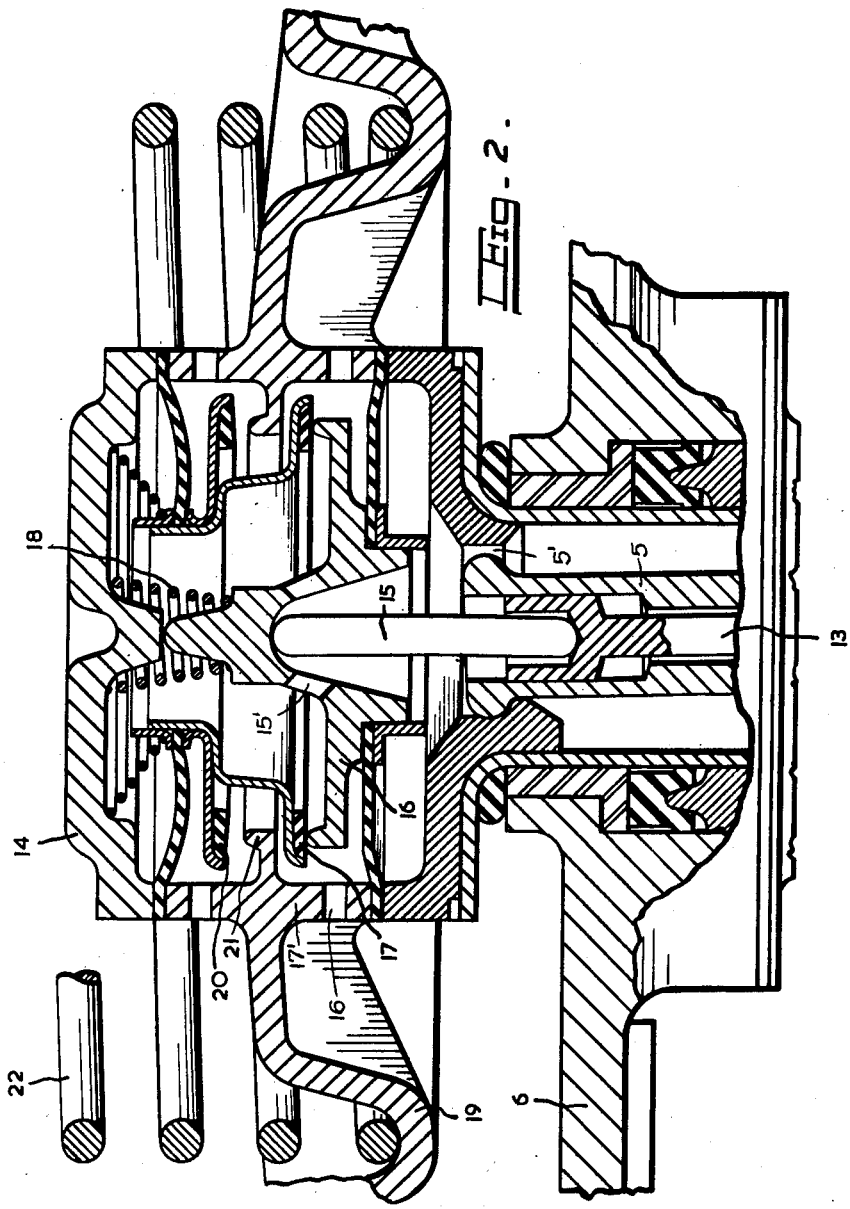
FIGURE 2 shows to a larger scale the valve controlling operation of the booster in the system shown in FIGURE 1.

Referring first to FIGURES 1 and 2, a driver operated brake pedal 1a is carried on the lower end of a pendant lever 1, which forms the first lever and is associated with a second lever 2 pivoted to the bodywork of the vehicle at 3. This second lever is urged about the pivot 3 in a counterclockwise direction by a spring 4 and its free end is engaged by the operating rod 5 of a booster cylinder 6 which derives its power from the vacuum developed by the induction system of the vehicle's engine.

The first and second levers are coupled together by a pin 7 on the first lever engaging in an elongated hole 8 in the second lever, and a further pin 9 on the first lever received in a notch 10 formed in the edge of the second lever. A peg 11 on the first lever engages one end of a rocking arm 12 pivoted to the second lever, the other end of this arm engaging a push-rod 13 which slides in the operating rod 5 of the booster and actuates a valve assembly 14 controlling the booster.

This valve assembly is shown in FIGURE 2. The push-rod 13, acting through a further rod 15, normally holds a disc 16 against an annular valve head 17, against the action of a spring 18, to cut off communication between the lower side of the piston 19 of the booster and atmosphere. At the same time, it holds a further valve head 20, which moves with the head 17, clear of its seating 21 so that the two sides of the piston are in communication. The upper side is permanently connected to a vacuum source.

The function and behaviour of a valve assembly of this kind are well known in the field of boosters. As the push rod 13 is lowered, it first causes the valve head 20 to engage its seating 21, cutting off communication between the two sides of the piston 19, and then admits atmospheric air to the lower side of the piston, by lowering the disc 16 away from the valve head 17 to allow atmospheric air to enter axially past the operating rod 5, through the clearance 5', past the rod 15 and radially outward through passage 15' in the disc 16 and passage 16' in the surrounding portion 17' of the central part of the piston, to move the piston upwards against the action of a spring 22, taking with it the operating rod 5.

The brake pedal lever is connected at 23 to an actuating member of the vehicle brake linkage, in the present case a piston rod 24 of a hydraulic master cylinder 25 although it could equally well be a mechanical linkage.

Normal operation of the system of FIGURES 1 and 2 is as follows: When the brake pedal 1a is depressed, the lever 1 turns in a clockwise direction about the axis of the pin 9, whilst the pin 7 moves in the elongated hole 8, and this movement of the lever 1 is sufficient to move the peg 11 away from the rocking arm 12 enough to allow the rocking arm 12 to turn to lower the push-rod 13, bringing the booster into action in the manner described to turn the second lever 2 about its fixed pivot 3. The result of this is to augment the force applied by the driver to move the pedal lever 1, as the engagement of the two levers through the pins 7 and 9 ensures that they move substantially together. At the same time, this movement tends to rock the arm 12 back to its original position, cutting off the booster. The overall result is the setting up of a balance between the tendency of the booster to turn the levers 1 and 2 as a unit about the pivot 3, and the tendency of this movement to cut off the booster, so that the levers take up a position which is dependent on the force applied to the lever 1 by the driver, and the force applied to the piston rod 24 of the master cylinder 25 is proportional to that applied by the driver but augmented by the booster 6.

If, through absence of a vacuum reservoir, or through loss of vacuum due to a fault or repeated application of the brakes, the booster 6 is inoperative and no force is applied by the rod 5 to turn the second lever 2, the first lever simply pivots about the axis of the pin 7, and the pin 9 can move clear of the notch 10. As the distance of the axis of the pin 7 from the line of action of the master cylinder piston rod 24 is only about half that of the pivot 3 from this line, the lever 1 must now move through approximately twice the angular distance to achieve the same displacement of the rod 24, but the force required is only about half that which would have been required in the absence of booster assistance if the lever 1 had been turning together with the lever 2 about pivot 3.

It will be understood that the relative positions of the pivot 3, the pins 7 and 9, and the point of connection of the rod 24 are chosen to give a leverage such that if the booster fails, the average driver is still capable of bringing the vehicle safely to a halt. The fact that this requires increased pedal travel is unimportant in an emergency.

The remaining FIGURES 3 to 7 show variants on the system shown in FIGURE 1, although they are all the same in principle. Where possible the same reference numerals have been used.

Figure 3:
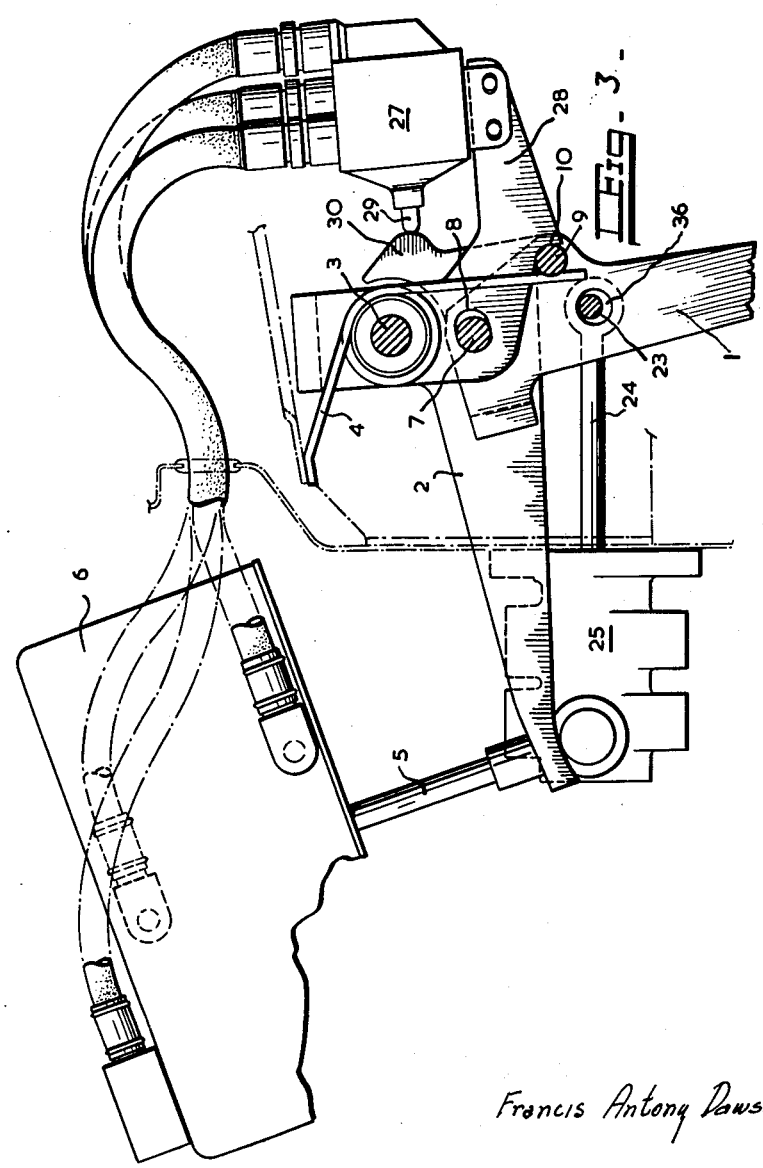
FIGURE 3 shows another form of vehicle braking booster.
Figure 4:
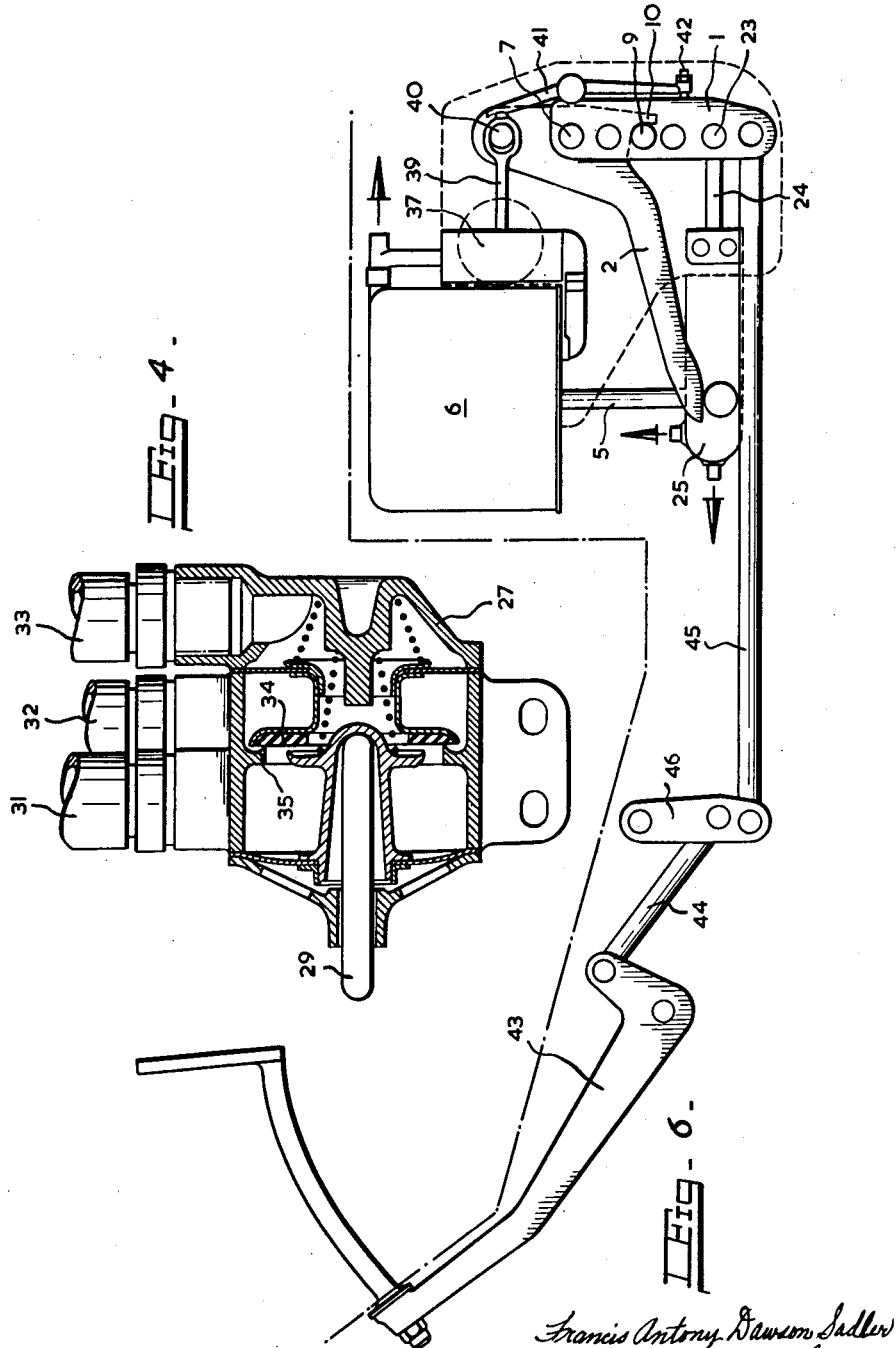
FIGURE 4 shows to a larger scale the valve controlling operation of the booster shown in FIGURE 3.

In the embodiment shown in FIGURE 3, the valve assembly controlling the booster, instead of being within the booster piston, is carried between the two levers. The valve housing is shown at 27, carried on a bracket 28 which is rigidly secured to the second lever 2, whilst the actuating rod for the valves is shown at 29, engaged by a nose 30 on the lever 1. The valve assembly is in communication with the booster cylinder 6 and the source of vacuum through flexible pipes 31, 32 and 33. FIGURE 4 shows the details of the valves, and in particular how movement of the rod 29 to the right with respect to the housing 27 first cuts off communication between pipe 31 leading to the lower side of the booster piston, and pipe 33 leading to the upper side of the piston, and then lifts a valve head 34 off its seating 35 to admit air to the lower side of the booster piston.

The embodiment of FIGURE 3 includes provision for fine adjustment of the position of the master cylinder piston rod 24 with respect to the lever by the mounting of the pivotal connection 23 in an eccentric bush 36.

Figure 5:
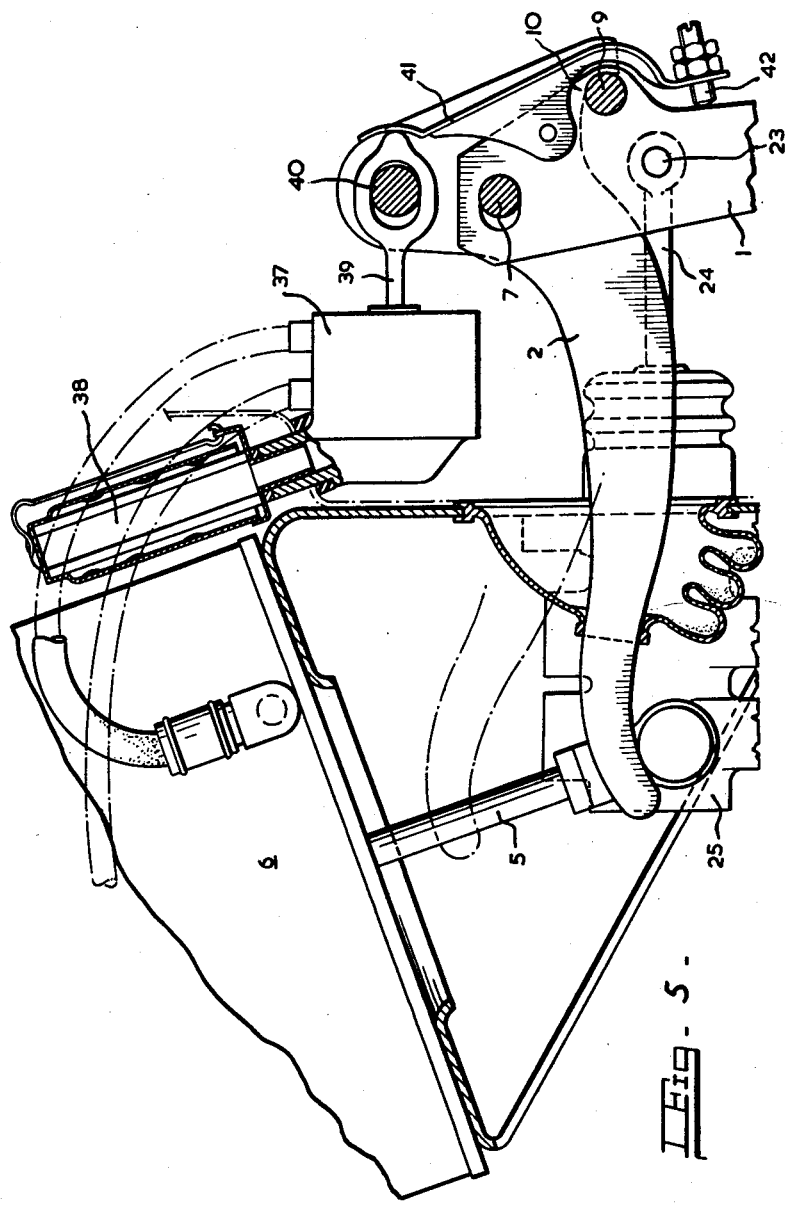
FIGURE 5 shows a still further form of vehicle braking booster.

The embodiment shown in FIGURE 5 has the valve assembly external to the booster cylinder 6, but on a fixed part of the vehicle bodywork. The valve housing is shown at 37, with an air filter 38 for the incoming atmospheric air, and an actuating rod 39 which slides on a pin 40 on an extension of the lever 2 to be engaged by a rocking arm 41 which is pivoted to the lever 2 and engages the lever 1 through the medium of an adjustable stop 42. In this embodiment the pin 7 is on the lever 2 and the slot 8 is in the lever 1, but this does not affect the operation.

The embodiment shown in FIGURE 6 is kinematically closely similar to that of FIGURE 5, except that, instead of the driver-operated foot pedal being mounted directly on the lower end of the lever 1, it is connected to that lower end through a linkage comprising a pedal lever 43, pull-rods 44 and 45, and a slave link 46. This enables the booster unit to be placed at a rather more convenient point in the vehicle when space around the toeboard is restricted.

FIGURE 7 shows an embodiment which is kinematically the same as that of FIGURE 1, but the parts have been rearranged to suit a vehicle in which the relative positions of the booster, the master cylinder, and the pedal lever of the FIGURE 1 arrangement were inconvenient. Here the lever 2 extends in the same general direction as the lever 1. The pin 9 is on the lever 2 instead of the lever 1, and abuts against the edge of the lever 1. Actuation of the valve assembly, which is the same as that of FIGURE 1, is by a rocking arm 47 pivoted to lever 2 at 48 and engaging behind the edge of lever 1, at one end, whilst its other end engages the push-rod 13 (not visible in FIGURE 5).

It will be understood that whilst the invention has been described by way of example with reference to vacuum booster assistance of vehicle brakes, it could be applied to other situations where an effort causing a mechanical movement is assisted by a booster, and the source of power for the booster could for example be compressed air, or a liquid under pressure.

I claim:

1. A booster-assisted actuating system comprising in combination a first lever, a second lever, a fixed mounting, a first pivotal connection between said second lever and said mounting, a second pivotal connection between said first and second levers, an abutment connection between said first and second levers, said second pivotal connection being disposed between said first connection and said abutment connection, a force input point on said first lever, a force-output point on said first lever, the distance between said second pivotal connection and said force-output point being substantially less than the distance between said first pivotal connection and said force output point, force-boosting means, a connection between said force-boosting means and said second lever, valve means controlling said force-boosting means, said valve means being controlled by relative movement of said first and second levers in such a manner that, on application of a force at said force-input point in a direction such as to turn said first lever to break said abutment connection, said valve means are controlled to energise said booster means to turn said second lever about said first pivotal connection to re-establish said abutment connection and thereby assist movement of said first lever, whereas when said booster is inoperative, said first lever pivots about said second pivotal connection.

2. A booster-assisted actuating system as in claim 1, wherein said force-output point lies between said force-input point and said second pivotal connection.

3. A booster assisted actuating system as in claim 1, wherein said second pivotal connection is a pin-and-slot connection allowing a small initial relative pivotal movement between said levers about said abutment connection controlling said valve means.

4. A booster-assisted actuating system as in claim 1, wherein said abutment means comprise a pin on said first lever engaging in a notch on said second lever.

5. A booster-assisted actuating system as in claim 1, including an arm pivotally mounted on said second lever, an abutment portion on said first lever, and a connection between said arm and said valve means, relative movement of said levers causing said abutment portion to engage and turn said arm and thereby to control said valve means.

6. A booster-assisted actuating system as in claim 1, wherein said valve means comprise first and second relatively movable portions, said first portion being secured to said first lever and said second portion being secured to said second lever.

7. A booster-assisted actuating system as in claim 1, wherein said force-input point comprises a foot-operable pedal.

8. A booster-assisted actuating system as in claim 1, wherein said force-boosting means comprise a vacuum-operated booster.

References Cited in the file of this patent

UNITED STATES PATENTS

| | | |
|---|---|---|
| 1,927,942 | Lobez et al. | Sept. 26, 1933 |
| 2,229,247 | Kamenarovic | Jan. 21, 1941 |
| 2,937,620 | Ayers | May 24, 1960 |